(12) United States Patent
Epelman-Wang et al.

(10) Patent No.: US 9,805,373 B1
(45) Date of Patent: Oct. 31, 2017

(54) EXPERTISE SERVICES PLATFORM

(75) Inventors: Hernan Epelman-Wang, Redwood City, CA (US); David Gilmour, Los Altos, CA (US); Jonathan Michael Goldberg, Oakland, CA (US); Andrew Hamel, San Jose, CA (US); Nicolas Trown, La Honda, CA (US); Eric Wang, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2576 days.

(21) Appl. No.: 10/300,088

(22) Filed: Nov. 19, 2002

(51) Int. Cl.
  *G06Q 10/00* (2012.01)
  *G06Q 30/02* (2012.01)
  *G06Q 50/00* (2012.01)

(52) U.S. Cl.
  CPC ......... *G06Q 30/02* (2013.01); *G06Q 30/0269* (2013.01); *G06Q 50/01* (2013.01)

(58) Field of Classification Search
  USPC .......................................................... 705/1
  See application file for complete search history.

(56) References Cited

U.S. PATENT DOCUMENTS

| | | |
|---|---|---|
| 4,914,586 A | 4/1990 | Swinehart et al. |
| 4,970,681 A | 11/1990 | Bennett |
| 5,051,891 A | 9/1991 | MacPhail |
| 5,093,918 A | 3/1992 | Heyen et al. |
| 5,247,575 A | 9/1993 | Sprague et al. |
| 5,247,661 A | 9/1993 | Hager et al. |
| 5,251,131 A | 10/1993 | Masand et al. |
| 5,251,159 A | 10/1993 | Rowson |
| 5,276,869 A | 1/1994 | Forrest et al. |
| 5,297,057 A | 3/1994 | Kramer et al. |
| 5,325,466 A | 6/1994 | Kornacker |
| 5,331,579 A | 7/1994 | Maguire, Jr. et al. |
| 5,333,237 A | 7/1994 | Stefanopoulos et al. |
| 5,428,740 A | 6/1995 | Wood et al. |
| 5,428,778 A | 6/1995 | Brookes |
| 5,438,526 A | 8/1995 | Itoh et al. |
| 5,442,778 A * | 8/1995 | Pedersen et al. |
| 5,446,891 A | 8/1995 | Kaplan et al. |
| 5,473,732 A | 12/1995 | Chang |
| 5,481,741 A | 1/1996 | McKaskle et al. |
| 5,483,650 A * | 1/1996 | Pedersen et al. ................. 707/2 |
| 5,488,725 A | 1/1996 | Turtle et al. |

(Continued)

FOREIGN PATENT DOCUMENTS

| | | |
|---|---|---|
| EP | 0 751 471 A1 | 1/1997 |
| WO | WO 96/23265 | 8/1996 |

(Continued)

OTHER PUBLICATIONS

Holtz, Shel. "Intranets: What's all the excitement?" Communication World. San Francisco: Jun./Jul. 1996. vol. 13, Iss. 6; p. 54.*

(Continued)

*Primary Examiner* — Gabrielle McCormick
(74) *Attorney, Agent, or Firm* — Kilpatrick Townsend & Stockton LLP

(57) ABSTRACT

A method and system for knowledge management are disclosed. A plurality of profiles of entities are identified wherein the profiles comprise a shared characteristic. The contents of the plurality of profiles are added to a generated aggregate profile.

37 Claims, 8 Drawing Sheets

(56) References Cited

U.S. PATENT DOCUMENTS

| | | | |
|---|---|---|---|
| 5,493,729 A | 2/1996 | Nigawara et al. | |
| 5,513,126 A | 4/1996 | Harkins et al. | |
| 5,530,852 A | 6/1996 | Meske, Jr. et al. | |
| 5,541,836 A | 7/1996 | Church et al. | |
| 5,544,067 A | 8/1996 | Rostoker et al. | |
| 5,555,426 A | 9/1996 | Johnson et al. | |
| 5,586,218 A | 12/1996 | Allen | |
| 5,608,900 A | 3/1997 | Dockter et al. | |
| 5,628,011 A | 5/1997 | Ahamed et al. | |
| 5,659,731 A | 8/1997 | Gustafson | |
| 5,659,732 A | 8/1997 | Kirsch | |
| 5,664,115 A | 9/1997 | Fraser | |
| 5,692,107 A | 11/1997 | Simoudis et al. | |
| 5,696,965 A | 12/1997 | Dedrick | |
| 5,704,017 A | 12/1997 | Heckerman et al. | |
| 5,717,914 A | 2/1998 | Husick et al. | |
| 5,717,923 A | 2/1998 | Dedrick | |
| 5,720,001 A | 2/1998 | Nguyen | |
| 5,724,567 A | 3/1998 | Rose et al. | |
| 5,727,129 A | 3/1998 | Barrett et al. | |
| 5,754,938 A | 5/1998 | Herz et al. | |
| 5,754,939 A * | 5/1998 | Herz et al. | 455/3.04 |
| 5,768,508 A | 6/1998 | Eikeland | |
| 5,778,364 A | 7/1998 | Nelson | |
| 5,794,210 A | 8/1998 | Goldhaber et al. | |
| 5,802,320 A | 9/1998 | Baehr et al. | |
| 5,802,518 A | 9/1998 | Karaev et al. | |
| 5,809,297 A | 9/1998 | Kroenke et al. | |
| 5,812,434 A | 9/1998 | Nagase et al. | |
| 5,835,087 A | 11/1998 | Herz et al. | |
| 5,855,008 A | 12/1998 | Goldhaber et al. | |
| 5,867,799 A | 2/1999 | Lang et al. | |
| 5,872,850 A | 2/1999 | Klein et al. | |
| 5,892,909 A | 4/1999 | Grasso et al. | |
| 5,899,981 A * | 5/1999 | Taylor et al. | 705/30 |
| 5,907,677 A | 5/1999 | Glenn et al. | |
| 5,907,836 A | 5/1999 | Sumita et al. | |
| 5,913,210 A | 6/1999 | Call | |
| 5,913,212 A | 6/1999 | Sutcliffe et al. | |
| 5,924,090 A | 7/1999 | Krellenstein | |
| 5,924,108 A | 7/1999 | Fein et al. | |
| 5,931,907 A | 8/1999 | Davies et al. | |
| 5,950,200 A | 9/1999 | Sudai et al. | |
| 5,974,412 A | 10/1999 | Hazlehurst et al. | |
| 5,995,597 A | 11/1999 | Woltz et al. | |
| 5,995,943 A | 11/1999 | Bull et al. | |
| 5,999,932 A | 12/1999 | Paul | |
| 5,999,975 A | 12/1999 | Kittaka et al. | |
| 6,005,597 A | 12/1999 | Barrett et al. | |
| 6,006,200 A | 12/1999 | Boies et al. | |
| 6,006,221 A | 12/1999 | Liddy et al. | |
| 6,009,410 A | 12/1999 | LeMole et al. | |
| 6,014,644 A | 1/2000 | Erickson | |
| 6,021,439 A | 2/2000 | Turek et al. | |
| 6,023,762 A | 2/2000 | Dean et al. | |
| 6,026,374 A | 2/2000 | Chess | |
| 6,029,195 A | 2/2000 | Herz | |
| 6,038,560 A | 3/2000 | Wical | |
| 6,044,205 A | 3/2000 | Reed et al. | |
| 6,044,376 A | 3/2000 | Kurtzman, II | |
| 6,049,797 A | 4/2000 | Guha et al. | |
| 6,052,122 A | 4/2000 | Sutcliffe et al. | |
| 6,052,709 A | 4/2000 | Paul | |
| 6,052,714 A | 4/2000 | Miike et al. | |
| 6,061,681 A | 5/2000 | Collins | |
| 6,064,980 A | 5/2000 | Jacobi et al. | |
| 6,094,652 A | 7/2000 | Faisal | |
| 6,105,023 A | 8/2000 | Callan | |
| 6,112,186 A | 8/2000 | Bergh et al. | |
| 6,115,709 A * | 9/2000 | Gilmour et al. | 707/9 |
| 6,119,167 A | 9/2000 | Boyle | |
| 6,151,600 A | 11/2000 | Dedrick | |
| 6,154,783 A | 11/2000 | Gilmour et al. | |
| 6,161,139 A | 12/2000 | Win et al. | |
| 6,175,831 B1 | 1/2001 | Weinreich et al. | |
| 6,182,067 B1 | 1/2001 | Persnell et al. | |
| 6,182,131 B1 | 1/2001 | Dean et al. | |
| 6,195,660 B1 | 2/2001 | Polnerow et al. | |
| 6,199,077 B1 | 3/2001 | Inala et al. | |
| 6,205,456 B1 | 3/2001 | Nakao | |
| 6,205,472 B1 | 3/2001 | Gilmour | |
| 6,230,189 B1 | 5/2001 | Sato et al. | |
| 6,233,590 B1 | 5/2001 | Shaw et al. | |
| 6,253,202 B1 | 6/2001 | Gilmour | |
| 6,253,216 B1 | 6/2001 | Sutcliffe et al. | |
| 6,269,369 B1 | 7/2001 | Robertson | |
| 6,292,769 B1 | 9/2001 | Flanagan et al. | |
| 6,298,348 B1 | 10/2001 | Eldering | |
| 6,327,590 B1 * | 12/2001 | Chidlovskii et al. | 707/5 |
| 6,330,610 B1 | 12/2001 | Docter et al. | |
| 6,353,827 B1 | 3/2002 | Davies et al. | |
| 6,360,227 B1 | 3/2002 | Aggarwal et al. | |
| 6,374,237 B1 | 4/2002 | Reese | |
| 6,377,949 B1 | 4/2002 | Gilmour | |
| 6,397,233 B1 | 5/2002 | Okawa et al. | |
| 6,404,762 B1 | 6/2002 | Luzeski et al. | |
| 6,405,197 B2 | 6/2002 | Gilmour | |
| 6,405,243 B1 | 6/2002 | Nielsen | |
| 6,415,283 B1 | 7/2002 | Conklin | |
| 6,421,669 B1 | 7/2002 | Gilmour et al. | |
| 6,434,607 B1 | 8/2002 | Haverstock et al. | |
| 6,449,682 B1 * | 9/2002 | Toorians | 711/100 |
| 6,460,036 B1 | 10/2002 | Herz | |
| 6,571,245 B2 | 5/2003 | Huang et al. | |
| 6,629,097 B1 | 9/2003 | Keith | |
| 6,640,229 B1 | 10/2003 | Gilmour et al. | |
| 6,647,384 B2 | 11/2003 | Gilmour | |
| 6,651,039 B1 | 11/2003 | Ikuta et al. | |
| 6,651,253 B2 | 11/2003 | Dudkiewicz et al. | |
| 6,675,299 B2 | 1/2004 | Porter et al. | |
| 6,711,570 B1 | 3/2004 | Goldberg et al. | |
| 6,711,585 B1 | 3/2004 | Copperman et al. | |
| 6,732,358 B1 | 5/2004 | Siefert | |
| 6,820,204 B1 | 11/2004 | Desai et al. | |
| 6,832,224 B2 | 12/2004 | Gilmour | |
| 6,901,394 B2 | 5/2005 | Chauhan et al. | |
| 6,970,879 B1 | 11/2005 | Gilmour | |
| 7,203,725 B1 | 4/2007 | Gilmour et al. | |
| 2001/0013029 A1 | 8/2001 | Gilmour | |
| 2001/0047276 A1 * | 11/2001 | Eisenhart | 705/1 |
| 2002/0078050 A1 | 6/2002 | Gilmour | |
| 2002/0165861 A1 | 11/2002 | Gilmour | |
| 2002/0194178 A1 | 12/2002 | Gilmour et al. | |
| 2005/0004874 A1 | 1/2005 | Gilmour et al. | |
| 2007/0112845 A1 | 5/2007 | Gilmour et al. | |

FOREIGN PATENT DOCUMENTS

| | | |
|---|---|---|
| WO | WO 97/02537 | 1/1997 |
| WO | WO 98/04061 A | 1/1998 |
| WO | WO 98/40832 A2 | 9/1998 |
| WO | WO 99/39279 | 8/1999 |

OTHER PUBLICATIONS

Welcome to enonymous.com, Web page, "Be Privacy Aware . . . Be enonymous", http:/ /www.enonymous.com/default.asp.

Enonymous Web Page, "Why be enonymous?", http:/ /www.enonymous.com/whybeenon.asp.

Enonymous Web Page, What is enonymous advisor?, http:/ /www.enonymous.com/whatisit.asp.

Enonymous Web Page, "How enonymous advisor beta works . . . ", http:/ /www.enonymous.com/howitworks.asp.

Enonymous Web Page, "The enonymous zone . . . ", http:/ /www.enonymous.com/zone.asp.

Enonymous Web Page, "The enonymous profile . . . ", http:/ /www.enonymous.com/profile.asp.

Enonymous Web Page, "Frequently Asked Questions", http:/ /www.enonymous.com/faq.asp.

Yenta: A Multi-Agent, Referral-Based Matchmaking System, Leonard N. Foner, *The First International Conference on Autonomous Agents (Agents '97)*, Marina del Rey, CA, 1997.

(56) References Cited

OTHER PUBLICATIONS

"A Multi-Agent Referral System for Matchmaking", Leonard N. Foner, *The First International Conference on the Practical Applications of Intelligent Agents and Multi-Agent Technology*, London UK, Apr. 1006.
"Clustering and Information Sharing in an Ecology of Cooperating Agents", Leonard N. Foner, *AAAI Workshop on Information Gathering in Distributed, Heterogenous Environments '95*, Palo Alto, CA 1995.
"Somewhat-by-topic linearization of Yenta," Leonard Foner, last modified Feb. 11, 1997, http:/ /www.media.mit.edu/people/foner/Yenta/linearization-by-topic.html.
"Political Artifacts and Personal Privacy: The Yenta Multi-Agent Distributed Matchmaking System", Leonard Newton Foner, Apr. 30, 1999, © Massachusetts Institute of Technology, 1999.
"*Taking the byte out of cookies: privacy, consent, and the Web*" Daniel Lin, and Michael C. Loui pp. 39-51—Proceeding of the ethics and social impact component on Shaping policy on the information age May 10-12, 1998.
"*A Security Policy Model for Clinical Information Systems*"—Anderson, R. J—Security and Privacy, 1996, Proceeding IEEE Symposium, May 6-8, 1996 pp. 30-43.
"Verity introduces new Profiler Kit and enhanced developer's Kit" IAC Newsletter Collection—M2 Presswire—Aug. 1998.
*Integrator's choice awards*; Brambert, Dave; Biangi, Susan—Network VAR V5.n10 p. 28 Oct. 1997.
"IS Puts Notes to the Test", Datamation, Mark Schlack vol. 37, No. 15, pp. 24-26, Aug. 1, 1991.
"MAIL-MAN": A Knowledge-Based Mail Assistant for Managers, Journal of Organizational Computing, L.F. Motiwalla and J.F. Nunamaker, Jr., vol. 2, No. 2, pp. 131-154, 1992 (abstract only).
"Topic Real-Time", HP-UX-Documentation Disc 50726-10186 (from Software Patent Institute Database of Software Technologies), Feb. 1, 1995.
"AskSam for Windows Getting Started Guide", (from Software Patent Institute Database of Software Technologies), first section, May 30, 1995.
"EZ Reader: Embedded AI for Automatic Electronic Mail Interpretation and Routing", Proceedings of the Thirteenth National Conference on Artificial Intelligence and the Eighth Innovative Applications of Artificial Intelligence Conference, A. Rice, J. Hsu, A. Angotti and R. Piccolo, vol. 2, pp. 1507-1517, Aug. 4-8, 1996 (INSPEC Abstract).
"Information Management for Knowledge Amplification in Virtual Enterprises", J. Numata et al., IEMC Proceedings, pp. 281-285, Aug. 18-20, 1996 (INSEC Abstract).
http:/ /www.email-software.com/pages/00108.htm, review of "Emailrobot for Exchange/SMTP".
http:/ /www.email-software.com/pages 00033.htm, review of "Signup V2.0".
"Knowledge Management: Fuel for Innovation", Bob Evans, CPM net Information Week on Line, Oct. 20, 1997.
"Knowing What We Know", Justin Hibbard, CPM net Information Week on Line, Oct. 20, 1997.
"Knowledge Management Evaluation Scenario", Jeff Angus with Jeetu Patel and Joe Fenner, CPM net Information Week on Line, Mar. 16, 1998.
"Knowledge Management Takes Industry's Center Stage", Elliot Maise, CMP net Computer Reseller News, Feb. 2, 1998, Issue 774.
"Knowledge Management: Great Concept . . . But What is It?", Jeff Angus, Jeetu Patel and Jennifer Harty, CMP net, Information Week on Line, Mar. 16, 1998.
"Knowledge Management's Net Gain", Kevin Jones, ZD net, Inter@ctive Week, Feb. 24, 1998.
"Open Sesame Site Just Works", Bill Burke, BusinessToday.com, http:/ /www.opensesame.com, Today's Column, Jan. 22, 1998.
"New eCommerce and Entertainment Web Site Demonstrates Leading Edge Personalization and Privacy Features" (press release), http://www.opensesame.com, Jan. 20, 1998.
"Neutral Agent Enables Personalized Surfing", R. Colin Johnson, CMP net TechWeb, http:/ /www.techweb.com. Feb. 4. 1998.
"Open Sesame and Verity Open Doors to Personalized Software", KMWorld.com, http:/ /www.kmworld.com, Feb. 6, 1998.
"Life Span vs Life Spam", George Gilder, Forbes ASAP, http:/ /www.forbes.com/asap, Apr. 6, 1998.
"Learn Sesame gets more personal", Jim Rapoza, PC Week Online, http:/ /www.zdnet.com/pcweek/reviews, Mar. 18, 1998.
"Natrificial Software Technologies Unveils Internet Brain Publishing" (press release), Natrificial Software Technologies, http:/ /www.natrificial.com, Jun. 9, 1998.
"Natrificial Software Technologies Introduces the Brain" (press release), Natrificial Software Technologies, http:/ /www.natrificial.com Jan. 26, 1998.
"The Brain: Much More the Way You Think", Scot Finnie, CMP Net Windows Magazine, http:/ /www.windowsmagazine.com, May 1, 1998.
"Your Brain on Windows", Leslie Ayers, ZD Net Products, http:/ /www.zdnet.com/products, Apr. 1998.
"What's New", Natrificial Software Technologies, http:/ /www.natrificial.com, 1998.
"Natrificial Software Technologies", Natrificial Software Technologies, http:/ /www.natrificial.com.
"Always Thinking Ahead", Natrificial Software Technologies, http:/ /www.natrificial.com.
"Digitize Your Mind", Natrificial Software Technologies, http:/ /www.natrificial.com.
"It's Your Thought That Counts", Natrificial Software Technologies, http:/ /www.natrificial.com.
"Knowledge if Power", Natrificial Software Technologies, http:/ /www.natrificial.com.
"Free Your Mind", Natrificial Software Technologies, http:/ /www.natrificial.com.
, "Abuzz's Mission"Abuzz, http:/ /www.abuzz.com.
"Beehive", Abuzz, http:/ /www.abuzz.com.
"Beehive: White Papers", Abuzz, http:/ /www.abuzz.com/home/white_papers.htm.
Open Sesame, http:/ /www.opensesame.com.
Open Sesame: The Company, http:/ /www.opensesame.com/company.html.
Open Sesame Published Papers, http:/ /www.opensesame.com/co_02.html.
Open Sesame: Agent Sourcebook, http:/ /www.opensesame.com/co_03.html.
Open Sesame: Products; Learn Sesame, http:/ /www.opensesame.com/products.html.
Open Sesame: Products; Why Personalize?, http:/ /www.opensense.com/prod_01.html.
Open Sesame: Products: Benefits, http:/ /www.opensesame.com/prod_02.html.
Open Sesame: Products; Competitive Summary, http:/ /www.opensesame.com/prod_03.html.
Open Sesame: Products; Product Datasheet, http:/ /www.opensesame.com/prod_04.html.
Open Sesame: Products/Demos, http:/ /www.opensesame.com/product_05.html.
e-Genie by Open Sesame: Your Entertainment Genie!, http:/ /egenie.opensesame.com/.
Open Sesame: Products; eGenie Live!, http:/ /www.opensesame.com/prod_06.html.
Open Sesame: Commitment to Privacy, http:/ /www.opensesame.com/privacy.html.
"A Short Introduction to NPtool", Atro Voutilainen, A Short Introduction to NPtool, http:/ /www.lingsoft.fi/doc/nptool/intro/.
NPtool Intro: Overview, http:/ /www.lingsoft.fi/doc/nptool/intro/overview.html.
NPtool Intro: Previous Work, http:/ /www.lingsoft/fi/doc/nptool/intro/previous.html.
NPtool Intro: NPtool inOutline, http:/ /www.lingsoft/fi/doc/nptool/intro/outline.html.
NPtool Intro: Syntactic Description, http:/ /www.lingoft.fi/doc/nptool/intro/syntax.html.

(56) References Cited

OTHER PUBLICATIONS

NPtool Intro: Performance, http://www.lingsoft/fi/doc/nptool/intro/performance.html.
NPtool Intro: Conclusion and Acknowledgements, http://www.lingsoft.fi/doc/nptool/intro/conculsion.html.
Orbital Technologies: Our Focus, http://www.oribtal-tech.com/.
Orbital Technologies: Orbital Products, http://www.orbital-tech.com/products.html.
Orbital Technologies: Organik KnowledgeWare, http://www.oribtal-tech.com/organikkw.html.
Orbital Technologies: About Orbital Technologies, http://www.orbital-tech.com/about.html.
Orbital Technologies: Organik Persona Server, http://www.orbital-tech.com/organikps.html.
Orbital Technologies: Corporate Fact Sheet, http://www.orbital-tech.com.
Orbital Technologies: Orbital Organik White Paper, Jul. 1997, http://www.oribtal-tech.com/.
"Applying Evolutionary Algorithms to the Problem of Information Filtering", Tjoa et al., Proceedings of the 8th International Workshop on Database and Expert System, Sep. 1-2, 1997, pp. 450-458.
"Distributing PeCo-Mediator: Finding Partners via Personal Connections," IEEE International Conference on Systems, Man, and Cybermatics, 1996, vol. 1, pp. 802-807, Oct. 14-17, 1996.
Open Sesame: Press, http://opensesame.com/press.cfm.
Open Sesame: Press, Reviews, http://www.opensesame.com/pr_02.html.
Autonomy Knowledge Management Products, http://www.agentware.com.
Autonomy Latest News, Autonomy Home Page, http://www:agentware.com.
Autonomy Knowledge Server Data Sheet, http://www.agentware.com.
Autonomy Knowledge Update Data Sheet, http://www.agentware.com.
The Technology Behind Autonomy Agentware, Autonomy Technology Page, http://www.agentware.com.
Autonomy Agentware Technology White Paper, http://www.agentware.com.
"Autonomy Launches New Knowledge Management Products to Help Companies Leverage Employee Expertise, Late-Breaking News and Existing Information Archives", Autonomy Press Release, Feb. 17, 1998, http://www.agentware.com.
"Autonomy Ships Agentware Products for Knowledge Management", Autonomy Press Release, Apr. 14, 1998, http://www.agentware.com.
Orbital Software : Organik : Introduction "A Multitude of Possibilities" Sep. 6, 2000. http://www.orbitalsw.com/product/product.htm.
Autonomy, Value Proposition, Sep. 6, 2000. http://www.autonomy.com/valuproposition.html.
Abuzz—Beehive Beta Program, Beehive, Aug. 10, 1998, http://www.buzz.com/home/demos.htm.
McCandless, "Managing your privacy in an on-line world", Internet Services, MIT Laboratory for Computer Science, (2 pages), Jan.-Feb. 1997.
Didier Bourigault et al., "Term Extraction + Term Clustering: An Integrated Platform for Computer-Aided Terminology", Proceedings of EACL 1999, pp. 15-22.
"Clustering: An Introduction", A Tutorial on Clustering Algorithms, http://home.dei.polimi.it/matteucc/Clustering/tutorial_html/, downloaded on Mar. 10, 2008, 5 pages.

NPtool Intro: Uses of a Noun Phrase Parser, http://www.lingsoft.fi/doc/nptool/intro/uses.html, downloaded Jul. 27, 1998, 1 page.
Natrificial: The Brain: Reviews, The Brain Press Reviews, http://www.natrificial.com/Brain/reviews.html, downloaded Sep. 4, 1998, 1 page.
Natrifical: The Brain: Info, "The Web at the Speed of Thought", http://www.natrificial.com/Brain/info_03.html, Sep. 4, 1998, 1 page.
Hensley et al., "Proposal for an Open Profiling Standard", NOTE-OPS-FrameWork.html, submitted to W3C on Jun. 2, 1997, XP-002279477, 12 pages.
Data Sources, Telecomm Software, Software, First Edition, 1998, 6 pages.
David Golberg et al., "Using Collaborative Filtering to Weave and Information Tapestry", Communications of the ACM, Dec. 1992, vol. 35, No. 12, pp. 61-70.
PCT Search Report for PCT/US99/19949, dated Dec. 7, 1999, 6 pages.
"Beehive", Abuzz—Beehive Benefits, http://www.abuzz.com/home/benefits.htm.
Supplementary European Search Report for EPO Application No. EP 99 94 5206, dated Oct. 24, 2006, 2 pgs.
Patent Cooperation Treaty's Written Opinion for International application No. PCT/US99/19949, dated Oct. 19, 2000, 5 pgs.
PCT Notification of Transmittal of International Preliminary Examination Report for PCT/US99/19949, dated Jan. 30, 2001, 6 pgs.
PCT Notification of Transmittal of the International Search Report or the Declaration for PCT/US99/19482 Containing International Search Report, dated Nov. 17, 1999, 4 pages.
Patent Cooperation Treaty's Written Opinion for International application No. PCT/US99/19482, dated Jul. 24, 2000, 5 pgs.
PCT Notification of Transmittal of International Preliminary Examination Report for PCT/US99/19482, dated Jan. 16, 2001, 6 pgs.
K. Moore, "MIME (Multipurpose Internet Mail Extensions) Part Two: Message Header Extensions for Non-ASCII Text," RFC1522, University of Tennessee, 11 pages, Sep. 1993.
Maltz, David, et al., Association for Computing Machinery: "Pointing the Way: Active Collabrative Filtering"; CHI '95 Mosaic of Creativity Confernce Proceedings, May 7-11, 1995; pp. 202-209.
Notification of Transmittal of International Preliminary Examination Report for PCT/US99/20672, dated Nov. 19, 2001, 6 pages.
Written Opinion for PCT/US99/20672, dated May 10, 2001, 6 pages.
PCT International Search Report for PCT/US99/20672, dated Dec. 16, 1999, 5 pages.
Written Opinion for PCT/US99/20487, dated Aug. 3, 2000, 5 pages.
Notification of Transmittal of International Preliminary Examination Report for PCT/US99/20487, dated Jan. 10, 2001, 5 pages.
PCT International Search Report for PCT/US99/20487, dated Nov. 17, 1999, 4 pages.
Notification of Transmittal of International Preliminary Examination Report for PCT/US99/21110, dated Feb. 21, 2001, 6 pages.
Written Opinion for PCT/US99/21110, dated Sep. 28, 2000, 3 pages.
PCT International Search Report for PCT/US99/21110, dated Jan. 24, 2000, 8 pages.
PCT International Search Report for PCT/US9921112, dated Apr. 25, 2000, 4 pages.
Notification of Transmittal of International Preliminary Examination Report for PCT/US99/21112, dated Feb. 21, 2001, 6 pages.
PCT International Search Report for PCT/US99/19949, dated Dec. 7, 1999, 5 pgs.

* cited by examiner

EXPERTISE SERVICES PLATFORM

FIELD OF THE INVENTION

The present invention pertains generally to the field of knowledge management. More particularly, the present invention relates to a general purpose expertise engine capable of integration with other enterprise software technologies.

BACKGROUND OF THE INVENTION

Many large companies face high product development expenditures due to inefficient awareness of existing expertise and sharing of that expertise and knowledge within the company. For example, a company may have several thousand employees spread over numerous of countries conducting research and development projects in different offices. Results developed during one research and development project in a company's office in Munich, for example, may be invaluable to another research and development project that is taking place in a company's office in New York. However, inefficient information management may cause the office in New York to unnecessarily spend thousands of dollars pursuing the same result already being sought by the team of co-workers in Munich.

The process of "capturing" knowledge in large organizations usually centers on a publishing model in which the burden falls on individual people to create documents about what they know. The process of creating documents is not only time consuming, but produces an unsatisfactory result, for several fundamental reasons. First, it is virtually impossible to capture the complete context and details of any project or business issue into a document. Information that is omitted may not have seemed important to the author, but it could be extremely valuable to someone else within the company. Second, there is a delay between the time at which business activities occur and the time at which a person can summarize those activities into a document, causing delays in availability of the latest development breakthroughs and/or the most current project statuses. In addition, not all of the information necessarily can be shared publicly. Due to the sensitive nature of some information, the originator of that information may wish to share it only with a certain set of people and/or under specific circumstances. This type of information rarely gets published, and an opportunity to gain further value from the information is often completely lost.

SUMMARY OF THE INVENTION

The present invention includes a method and system for knowledge management. In one embodiment, the method comprises identifying a plurality of profiles of entities, the profiles comprise a shared characteristic. The method also comprises generating an aggregate profile comprising contents of the plurality of profiles.

Other features of the present invention will be apparent from the following discussion.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
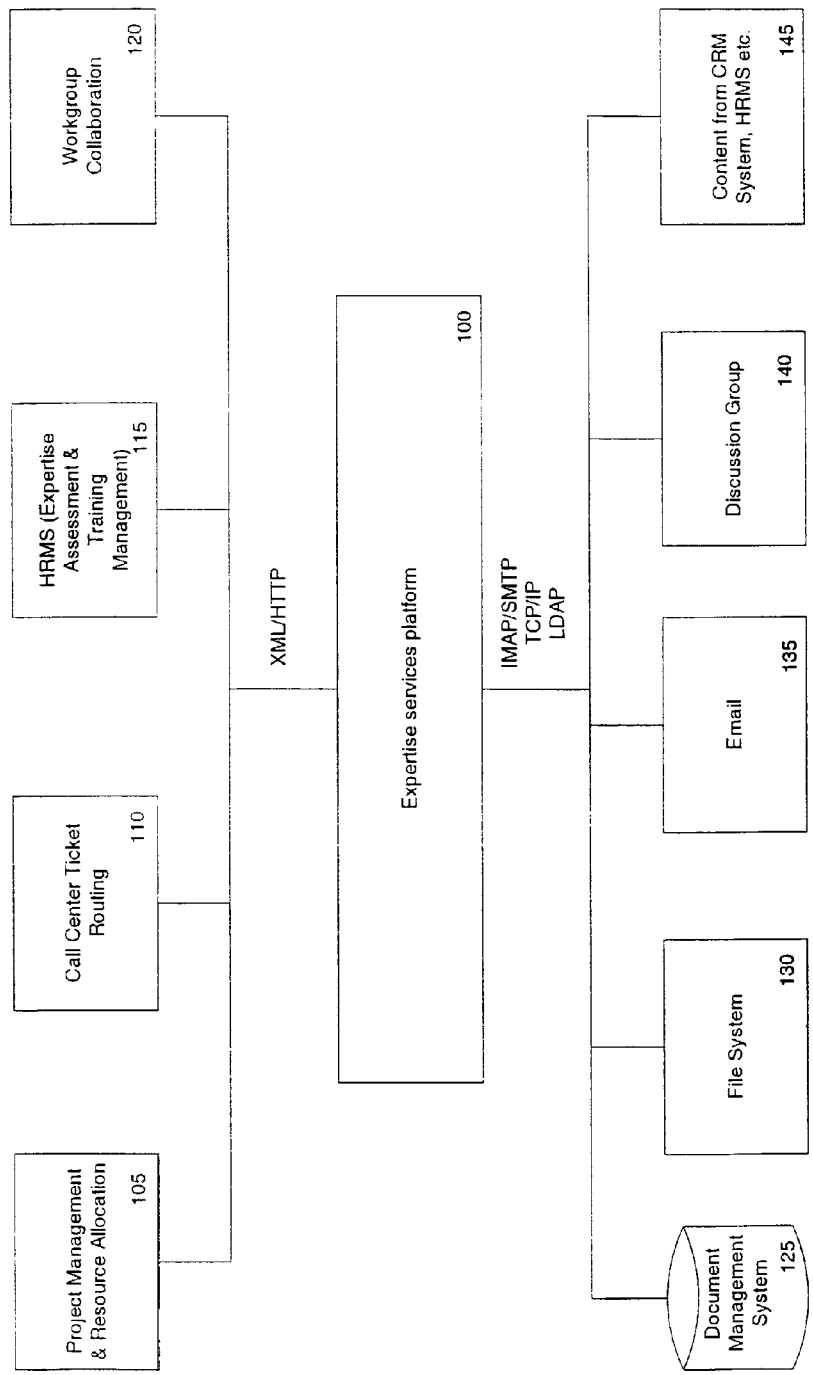
FIG. 1 illustrates a system architecture according to one embodiment of the present invention.

A method and apparatus for knowledge management are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. Thus, the present invention can include any variety of combinations and/or integrations of the embodiments described herein.

The present invention discloses a method and system for expertise management in an environment of a business entity. Knowledge profiles of entities are generated in order to automatically characterize individual people, groups or abstract sources of information.

It will be appreciated that the term "business entity" as used herein refers to a business entity, that utilizes services of the system of the present invention. The term "host application" as used herein refers to a software application that directly interacts with the system of the present invention. The term "client's system" as used herein refers to a computer system environment of the business entity. The term "user" as used herein refers to a user of a device, such as a handheld device, a personal computer, a workstation, etc., that provides the user with access to the features of the system of the present invention.

Introduction to Related Technology

One embodiment of the present invention utilizes Internet Message Access Protocol (IMAP). The IMAP is a protocol for retrieving email messages. It provides a method of accessing electronic mail or bulletin boards that are kept on a mail server allowing a client to access information as if it was stored locally. An IMAP server provides a message store for an incoming email message until users logon and download the message. Messages can be archived in folders, mailboxes can be shared, and the user may access multiple mail servers. IMAP provides integration with Multipurpose Internet Mail Extensions (MIME), which is a method utilized for transmitting non-text files via Internet email, that allows the users to read headers of the email messages without accepting the attached files or waiting for the attachments to download.

The invention utilizes Simple Mail Transfer Protocol (SMTP). SMTP is a standard mail TCP/IP protocol on the Internet that defines the message format and the message transfer agent, which stores and forwards email messages.

The present invention makes use of a servlets. Servlets can be Java applications, applets, which run on a Web server or application server and provide server-side processing, typically to access a database. A servlet is a Java-based alternative to Common Gateway Interface (CGI) scripts, interface programs, usually written in C or PERL, that enable an Internet server to run external programs to perform a specific function. A difference between servlets and CGI scripts is that a Java servlet is persistent, whereas a CGI script is not. This means that once it is started, the servlet stays in memory and can fulfill multiple requests. In contrast, a CGI script disappears once it has fulfilled a request.

The present invention also uses Java Database Connectivity (JDBC), which allows Java applications to access a database via an SQL language queries. Since Java Interpreters, i.e. Java Virtual Machines, are available for all major client platforms, JDBC allows generation of a platform independent database application.

In addition, another component of the present invention is JavaMail, which allows Java Applications to access an e-mail server. The invention also utilizes Simple Object Access Protocol (SOAP), which is a message-based protocol based on Extensible Markup Language (XML) for accessing services on the Web. Another component utilized by the inventions is .NET, a framework for web-based services and component software developed by Microsoft, Inc. of Redmond, Wash.

The invention also utilizes Application Program Interface (API). API is a language and message format used by an application program to communicate with an operating system or some other control program. APIs are implemented by writing function calls in the application program, which provide a linkage to a required subroutine for execution.

Exemplary Architecture

As a component of a host application, an expertise services platform provides a way to create, access and maintain profiles of entities, that automatically characterize individual people, groups, or abstract sources of information.

FIG. 1 illustrates an exemplary architecture of a client's system incorporating an expertise services platform 100. The expertise services platform 100 may be invoked by any of a variety of applications provided by the client system. For example, the expertise services platform may be invoked by a project management and resource allocation application 105 to allow employees of a business entity to make informative management and resource allocation decisions. The expertise services platform 100 may also be invoked by a call center ticket routing application 110 in order to allow the client's system to intelligently route an incoming call to the best expert qualified to service the call. An Expertise Assessment and Training Management application 115 may be another application of the client's system invoking the expertise services platform 100 in order to properly assess the expertise in the business entity and also to identify proper training management forces for a particular training task. Workgroup collaboration application 120 may also utilize services provided by the expertise services platform 100 in order, for example, to determine which individuals should be included in a particular collaboration, based on their expertise. A corporate portal may also invoke the expertise services platform 100 in order to allow employees to search or browse available expertise in the organization. In one embodiment the applications communicate with the expertise services platform 100 via XML over HTTP. Expertise services platform 100 obtains data from variety of data storages, such as document management system 125, client's file system 130, email server 135, discussion group server 140 and other data storages 140, utilizing Transmission Control Protocol/Internet Protocol (TCP/IP), SMTP/IMAP and Lightweight Directory Access Protocol (LDAP) protocols, for example.

Figure 2:
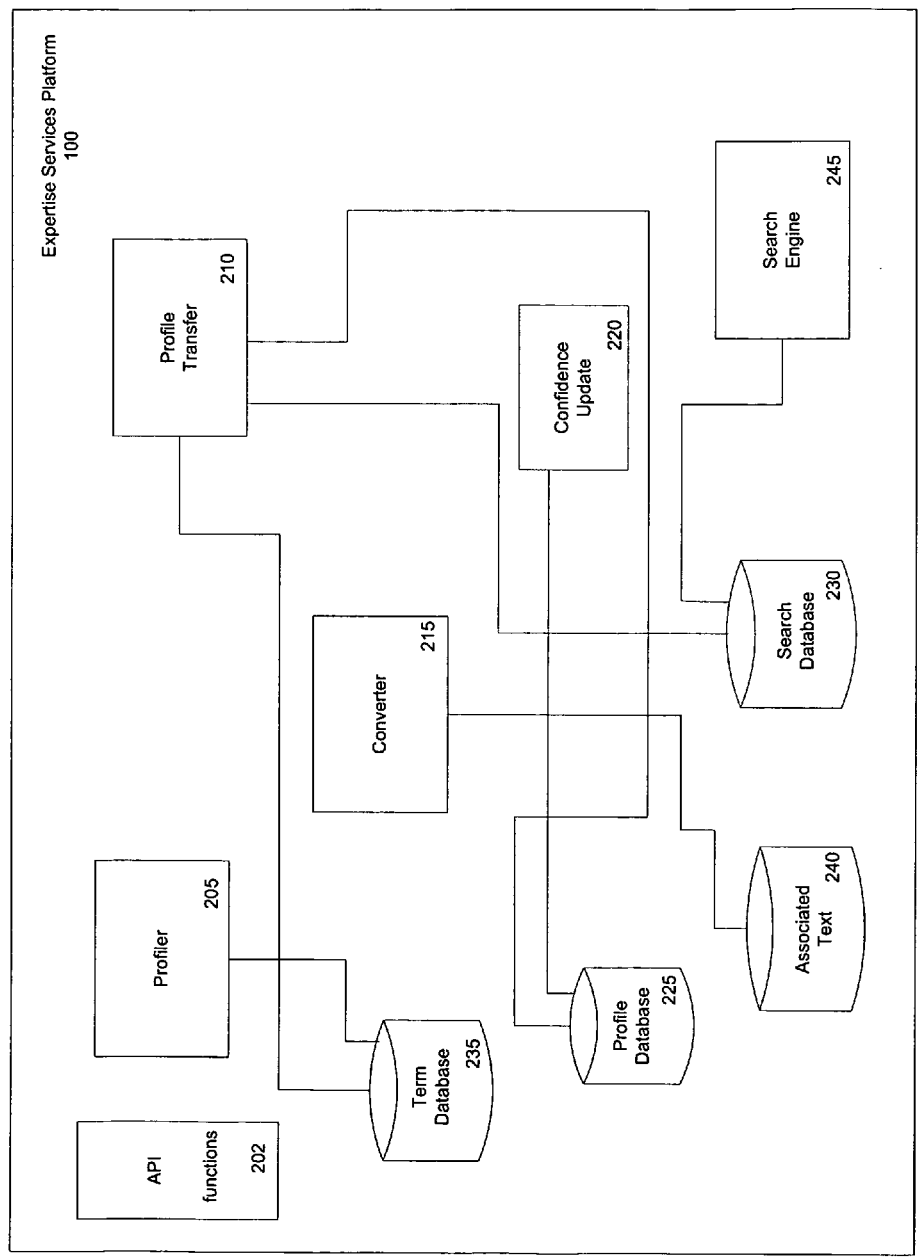
FIG. 2 illustrates components of an expertise services platform according to one embodiment of the present invention.

FIG. 2 illustrates components of the expertise services platform 100 according to one embodiment of the present invention. The expertise services platform 100 may be implemented as a Java application supporting XML and be implemented using a Java Virtual Machine. It will be appreciated that the present invention is not limited to XML; other well known methods and techniques may be used. In addition, different components of the expertise services platform 100 may be implemented using different Java Virtual Machines in order to distribute processing load across multiple platforms and allow parallel execution of the expertise services. As shown in FIG. 2, the expertise services platform 100 comprises a set of API routines 202, which allow the host application to invoke features of the expertise services platform 100 described in detail below. As shown in FIG. 2, the expertise services platform 100 also includes a profiler 205 that performs term extraction operations to construct profiles for profile objects. The extracted terms are temporarily stored in a term database 235 prior to adding the extracted terms to corresponding profiles stored in a profile database 225. Documents that are processed by the profiler 205 in order to perform term extraction operations are converted to a predetermined format by a converter 214 that is part of the expertise services platform 100 and stored in an associated text database 240. At a predetermined time or interval, a profile transfer module 210 updates the profile database 225 with the latest information, i.e. terms generated by the profiler 205. The profile database 225 may contain a historical list of indexed terms with importance rankings for each term. A confidence update module 220 calculates each term's ranking or confidence value, in order to ensure that each profile reflects the overall expertise of the profile owner. In one embodiment the expertise services platform 100 comprises a search engine 245 that provides a user with a search result. The operations of each of the components of the expertise services platform 100 are described in detail below.

Profile Creation

Figure 3:
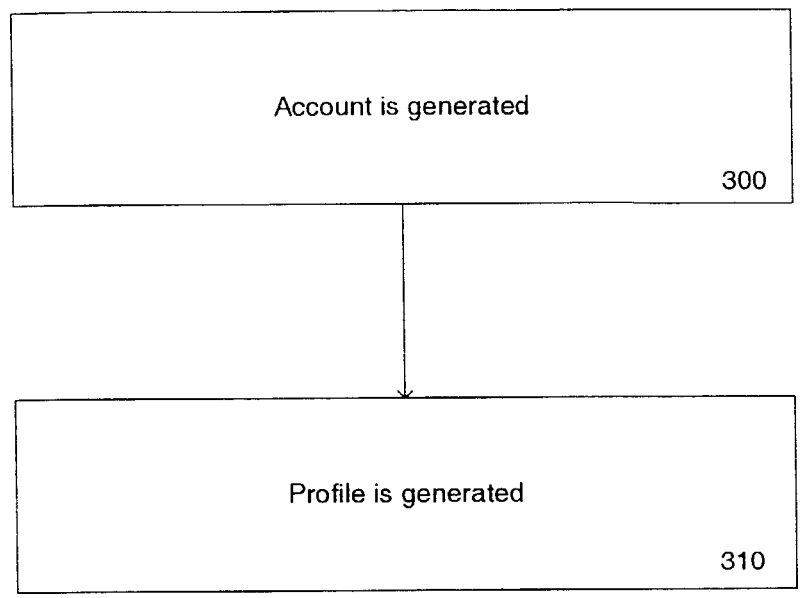
FIG. 3 is a high level flow diagram of profile generation process according to one embodiment of the present invention.

In one embodiment of the invention a profile is created for every account in the client's system. FIG. 3 illustrates a diagram of a high level profile generation process. At 300 of FIG. 3 an account is generated to define an entity. An entity may be any object such as a person, group of individuals, department, external third-party, defined resource, etc. Each account comprises optional account properties information defining additional information to be associated with an account and sets of terms with various access restrictions states that are collectively dubbed a profile for the particular account. Account properties may contain an entity's contact information, such as email address, phone number, name, department, etc. In one embodiment, an account may comprise several profiles of different entities. In addition, one entity may comprise several accounts. At 310 a profile for the account is generated. In one embodiment creation of a profile for the account comprises an expertise discovery process and a profiling process. As part of the expertise discovery process, the profiler 205 processes text associated with the entity.

Figure 4:
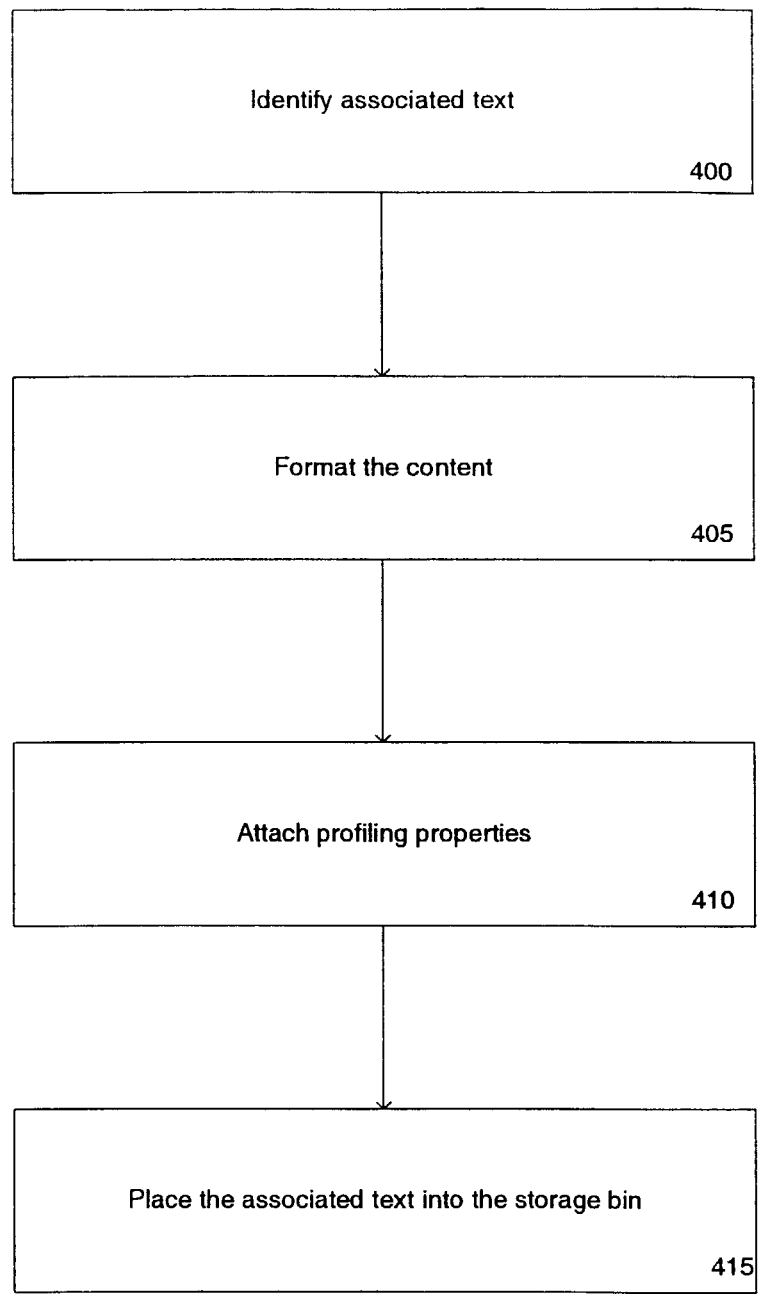
FIG. 4 is a flow diagram of a process of submitting content to be profiled to an expertise services platform according to one embodiment of the present invention.

FIG. 4 illustrates a process of submitting the associated text to the expertise services platform 100 in order for the profiler 205 to process the submitted information. At 400 the host application identifies the associated text that may need to be processed by the expertise services platform 100. In one embodiment the associated text may be an email message generated by the entity, an email message received by the entity, a document generated by the entity and identified by the entity as a text that may be processed by the expertise services platform 100, or an HTML document accessed by the entity or created by the entity. It will be appreciated that the associated text may be any of a variety of other types of information associated with the entity, such that the present invention is not limited to the information types listed above.

At 405 the content to be profiled is formatted as an email message by the host application. The profiling content may be included either in the body of the generated email message or as a MIME attachment attached to the generated email. At 410 a properties document containing the profiling properties associated with the entity and extracted from the entity's account is created and attached to the email message. In one embodiment the properties document is an XML document. At 415 the host application places the generated email message in a storage bin, utilizing an appropriate protocol, for example, SMTP or IMAP. In one embodiment the generated email messages may be placed in the storage bin via API routines, which are described later. In one embodiment the associated text storage bin is an IMAP storage bin. It will be appreciated that the storage bin does not have to be IMAP type and may be any type of a storage bin to store the generated email message to be processed by the expertise services platform 100.

The profiler 205, upon receiving the associated text, determines to which profile the extracted terms belong by utilizing information in the attached properties document. The profiling properties extracted from the attachment also provide the expertise services platform 100 with information such as to which term set the extracted terms belong, how heavily these terms should be weighted in the profile, etc. The profiler 205 profiles all of the text or document within the email, with the exception of the attachment used for profiling properties. Once the profiling is complete, the document may be deleted from the storage bin.

It will be appreciated that the host application may provide the associated text to the expertise services platform 100 utilizing any of a variety of other techniques well known in the art, such that the present invention is not limited to the technique described above.

Term Extraction

Figure 5:
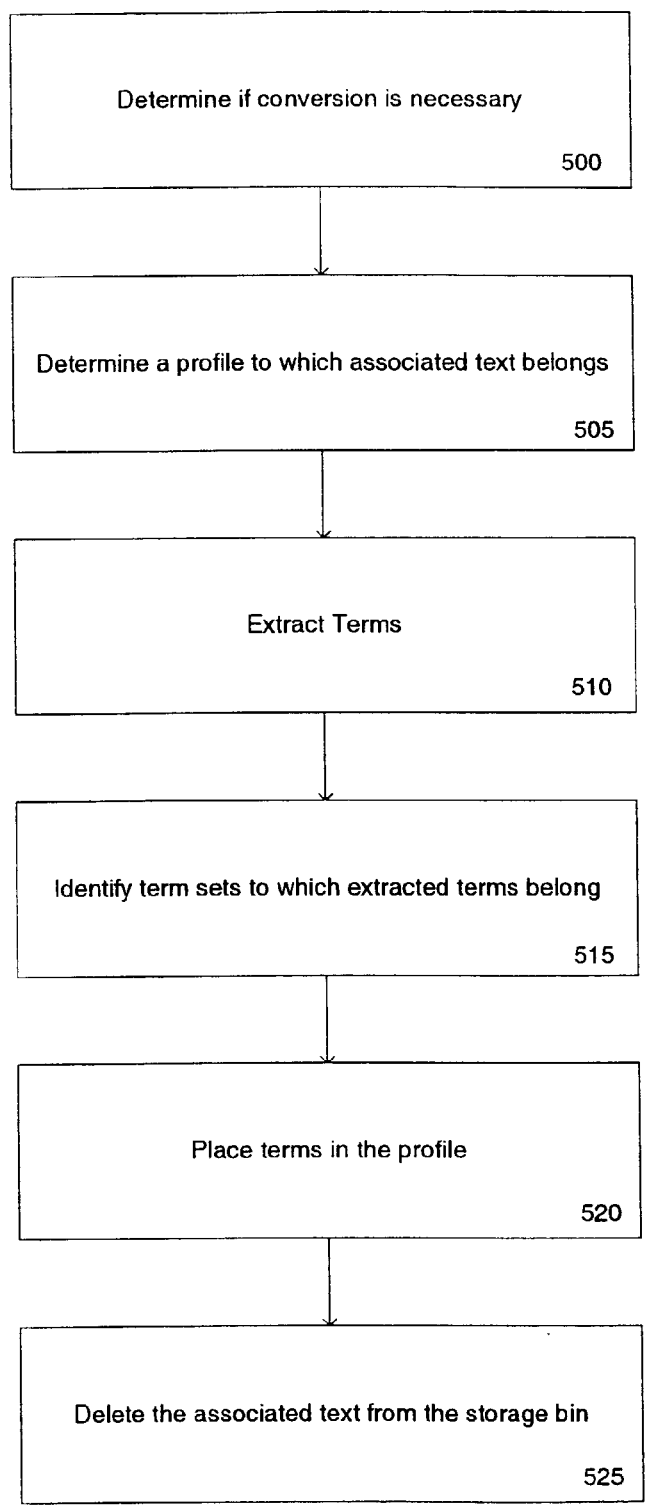
FIG. 5 is a flow diagram of a term extraction process according to one embodiment of the present invention.

In one embodiment of the present invention, upon retrieving the associated text from the storage bin and placing it in the associated text storage bin 240, the profiler 205 directs the converter 215 to determine whether the format conversion is necessary. FIG. 5 shows a term extraction process. At 500 of FIG. 5 the converter 215 determines the format of the associated text stored in the associated text storage bin 240. If the associated text corresponds to a format from a set of predetermined formats able to be processed by the profiler 205, the converter notifies the profiler that the associated text is ready to be processed. If the associated text does not correspond to the format recognizable by the profiler 205, the converter 215 converts the associated text and provides the profiler 205 with the associated text converted into a format recognizable by the profiler 205. In one embodiment, the profiler 205 recognizes ASCII text and HTML formats. It will be noted that the profiler 205 may be configured to recognize a variety of other formats, such that the present invention is not limited to the formats listed above. In addition, the profiler 205 may support all of the formats that the converter 215 can recognize and convert from, thus eliminating the need for the converter. At 505 the profiler 205 extracts information from the attachment included in the email comprising associated text in order to determine the profile to which the associated text belongs. In addition, the attachment may contain information such as identification of a term set to which the extracted terms belong, identification of the weighting of the associated text and of the extracted terms.

At 510 the profiler 205 extracts terms from the associated information stored in the associated text storage bin 240. The terms are extracted in the form of, for example, grammar terms, noun phrases, word collections or single words. Upon extraction of the terms, the terms are placed in the term database 235 prior to the profiler 205 determining which terms are to be added to the entity's profile. The profiler 205 determines to which profile the terms belong by processing information in the attachment. During term extraction the profiler 205 may determine the total number of words comprising the associated text, the density of recurring words within the document, the length of each term, i.e., the number of words that constitute the term, the part of the speech that each word within the document constitutes, and a word type, e.g. whether the terms is a lexicon term specific to the business entity's environment. The profiler 205 has access to a database of lexicon terms (not shown), which may identify both universal lexicon terms and environment lexicon terms specific to an environment within which the expertise services platform is being employed. Upon extraction of the terms, the profiler 205 determines the relevance of each extracted term in order to determine whether the term is relevant and needs to be added to the entity profile, by comparing the extracted terms to the terms in the universal lexicon terms and environment lexicon terms. In one embodiment, the confidence update module 220 assigns a value to each term based on a set of predetermined thresholds, such as the number of occurrences of a term in the associated text, the length of the term, a part of speech indication, etc. Upon the confidence update module 220 assigning the value to each term, the profiler 205 determines if the value is higher than a predetermined threshold, in which case the term is added to the entity's profile. Techniques for determining the relevance of a term in a document are well known in the art and do not require any further explanation. In one embodiment upon extraction of the terms and identification of the terms matching the universal lexicon terms and/or environment lexicon terms, the profiler 205 determines the term sets to which the extracted terms belong.

A profile of the entity may comprise several term sets, for example a private term set, a public term set, a set comprising terms corresponding to a particular field of the lexicon, a fixed term set comprising terms with the highest value assigned by the confidence update module, etc. Upon retrieving information from the attachment comprising profiling information, the profiler 205 may identify the term set to which the extracted terms belong. For example, the profiling attachment may specify that the terms extracted from the associated text should be associated with the public term set. Hence, the profiler 205 places the extracted terms from the associated text into the public term set of a profile. In one embodiment a term set may comprise subsets relating to different fields of expertise. For example, the public term set may comprise a networking subset including terms relating to the network technology. Upon extracting terms from the associated text and comparing the terms to the universal lexicon terms and/or environment lexicon terms, the profiler 205 may determine the subterm sets to which the terms may belong.

Figure 6:
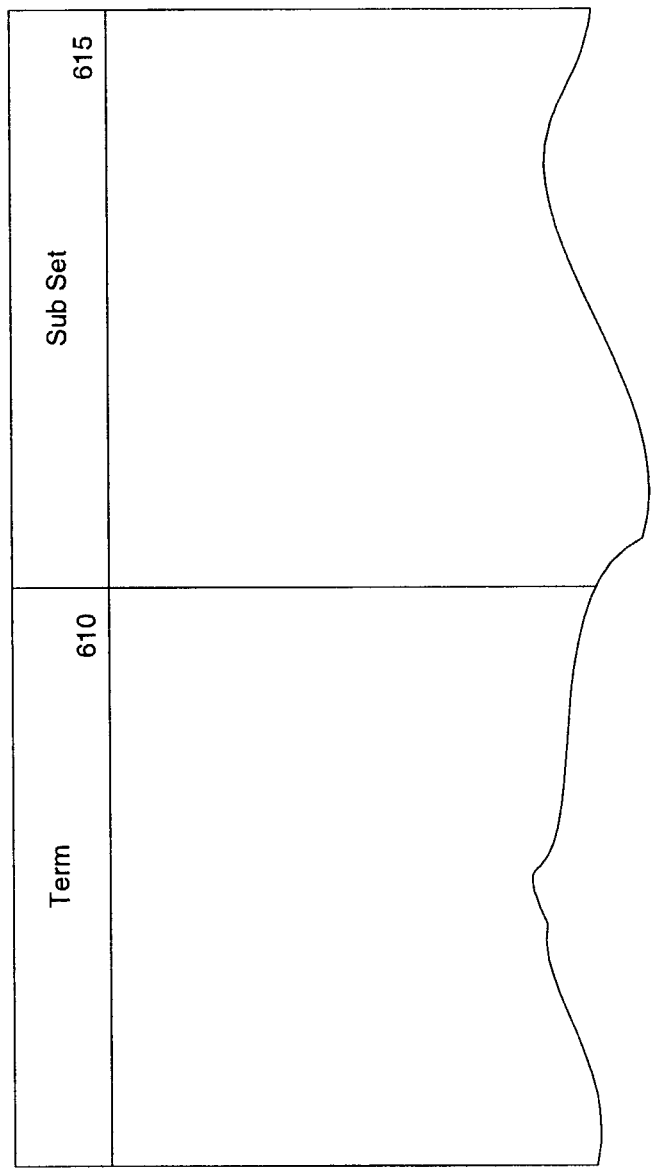
FIG. 6 illustrates a format of a lexicon table according to one embodiment of the present invention.

FIG. 6 illustrates a format of a table, which may be utilized to store universal lexicon terms or environment lexicon terms. As illustrated the table may include a term field 610 for storing terms present in the lexicon term set. The table may also include a subset field 615 that may store subsets of a term set to which the particular term belongs. For example, the field 615 may include a "networking" subset for a term "router" stored in the field 610. Continuing with this example, when the profiler 205 extracts information from the profile attachment and determines that the extracted terms should belong to the public term set, the profiler 205 continues extracting terms from the associated text and storing them in the term database 235. Upon extraction of a "router" term, the profiler 205 accesses the universal lexicon terms and/or environment lexicon terms in order to determine the subset to which the extracted term "router" belongs.

Upon identification of the extracted terms to be added to the entity's profile and determination of term sets to which the extracted terms should be added, the profile transfer 210 transfers the terms from the term database 235 to the profile database 225. In one embodiment the profile transfer 210 determines whether the profile of the entity already contains all the term sets and all the subsets to which the extracted terms belong. Continuing with the example above, upon determining that the "router" term belongs to the networking subset, the profile transfer 210 determines whether the profile of the entity already contains a networking subset. If the profile already includes a networking subset, the profile transfer 210 adds the extracted term to the subset. The profile transfer 210 creates the networking subset and inserts the extracted term to the newly created subset. The host application may specify the allowed terms sets within a particular profile. For example, the host application may not authorize presence of term sets in profiles, in which case the expertise profile transfer places the terms in a "default" term set.

In one embodiment the profile database 225 comprises historical information about each profile in the expertise services platform 100, such as the list of all the terms with confidence levels for each term. Upon transferring the extracted terms to the profile database 225, the profile transfer 210 transfers the latest added terms to the search database 230 in order to provide users with the latest information about the expertise in the client's environment.

In one embodiment, at predetermined time periods the confidence update module 220 determines whether the confidence levels of any terms need to be changed and whether any terms need to be removed from the profile due to the non-usage of these terms during a predetermined time interval. The confidence module update 220, upon recalculating the confidence levels, updates the profile database 225 and invokes the profile transfer module 210 to reflect the latest changes in the search database 230.

In one embodiment of the present invention, the profiler 205 may create an aggregate profile of a group of individuals, such as a corporate department, a news group, etc. For example, the profiler 205 may generate an aggregate profile for a sales department of the business entity. The host application may direct the expertise service platform 100 to generate an aggregate profile for a particular department. Continuing with the above example, the host application may direct the expertise services platform 100 to generate the aggregate profile for the sales department. The profiler 205 accesses the profile database 225 and determines which profiles belong to entities from the sales department by examining an appropriate field of the account property information. Each individual profile that belongs to an entity from the sales department is added to the aggregate profile for the sales department. In one embodiment the aggregate profiles are of the same format as individual profiles described above; that is, the aggregate profiles have term sets comprising collection of terms of the individual profiles used to generate the aggregate profile. In one embodiment an aggregate profile is a snapshot of individual profiles representing a group of entities at a specific point in time. In another embodiment the aggregate profile comprises the most current terms sets and is updated by the profile transfer module 225 in a manner described above with respect to individual profiles. It will be appreciated that an aggregate profile may include individual profiles sharing any similar characteristics and the present invention is not limited to an exemplary characteristic presented above.

Expertise Searching

In one embodiment of the present invention, the host application provides the user, e.g., an employee of the business entity, with an interface in order for the user to specify a type of expertise that the user requires. The user may utilize keywords to specify the required expertise. The user may also provide the system with a specific question or direct the system to search by context by providing a block of text. Upon submitting a query the host application forwards the query to the expertise services platform 100. In one embodiment the query is forwarded to the expertise services platform in a manner described above, by compiling the query into an email message format and submitting it to the expertise services platform 100. Upon receiving the email message with the query, the search engine 245 extracts the terms from the query and searches the search database 230 for profiles that contain matching terms in the public subset of the profiles. In one embodiment, the search engine 245 identifies profiles that comprise matching terms in the private subsets and prompts the entities of the profiles for authorization to utilize the information in the search result generated for the received query.

Figure 7:
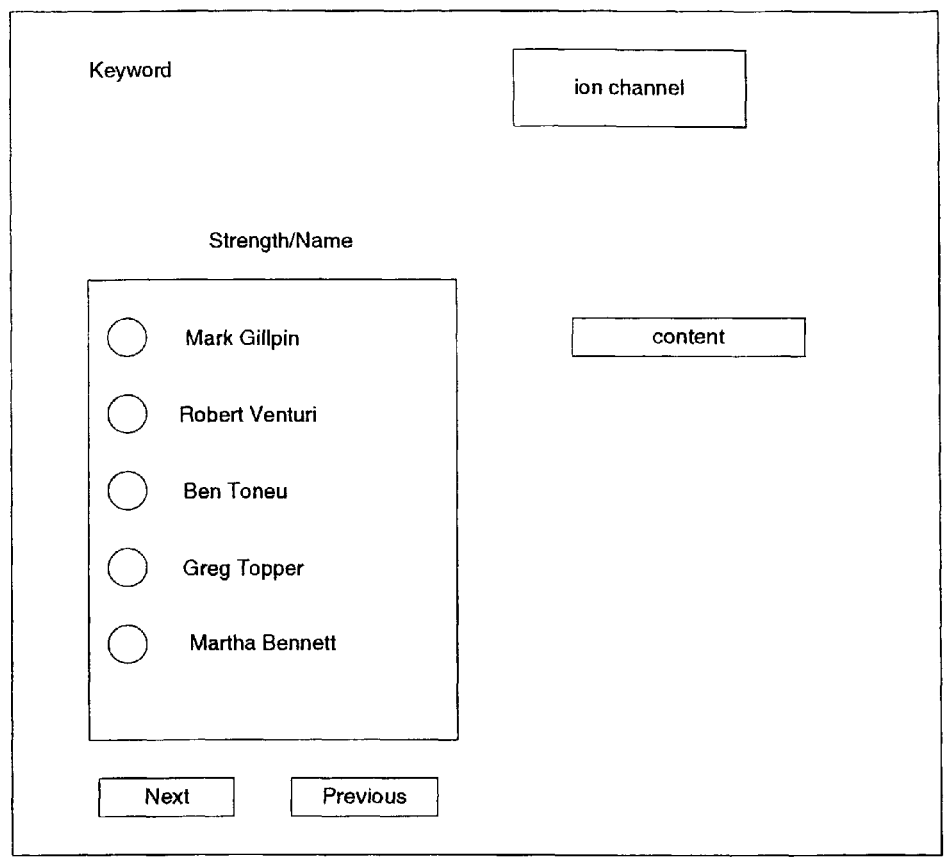
FIG. 7 illustrates a display of an expertise search result according to one embodiment of the present invention.

In one embodiment the user are provided with a list of people who were identified as experts in the area to which the user's query related. FIG. 7 illustrates an interface displaying a search result presented to a user whose query involved the keyword 'ion channel'. As illustrated in FIG. 7, the user is provided with a list of experts that were identified by the expertise services platform along with the strength of their expertise. The user is also presented with an option to automatically contact an expert from the list via email. In one embodiment, upon clicking on the name presented in the experts list, the user may be presented with information about the selected expert, such as title, department, contact information, a list of profile terms that matched the terms in the query, etc.

Expertise Services Platform API

In one embodiment of the invention the host application communicates with the expertise services platform 100 utilizing a variety of API routines 202. For example, the client's system administrator may utilize administration API routines in order to configure the properties that define how a host application may interact with the expertise services platform 100. The administration API routines may also allow registration of applications that are able to communicate with the expertise services platform 100. For example, a corporation may desire to enable several applications to interact with the expertise services platform 100, such as a workgroup collaboration application, a project management and resource allocation application, a call center ticket routing application, etc. In one embodiment the API routines 202 may provide the client with the ability to create and manage databases used by the expertise services platform 100. In addition, the client's system administrator may utilize administration API routines to manage servers that comprise expertise services platform 100 components.

In one embodiment of the invention the host application utilizes account management API routines in order to provide the expertise services platform 100 with access permissions on each profile associated with an account, to create, manage, modify and delete accounts for which profiles are created and maintained by the expertise services platform 100. The host application, in one embodiment, utilizes the account management API routines to create log in and log out methods and to create different administrator-type accounts. Account management API routines may also allow the host application to manage contact information tied to an account.

Figure 8:
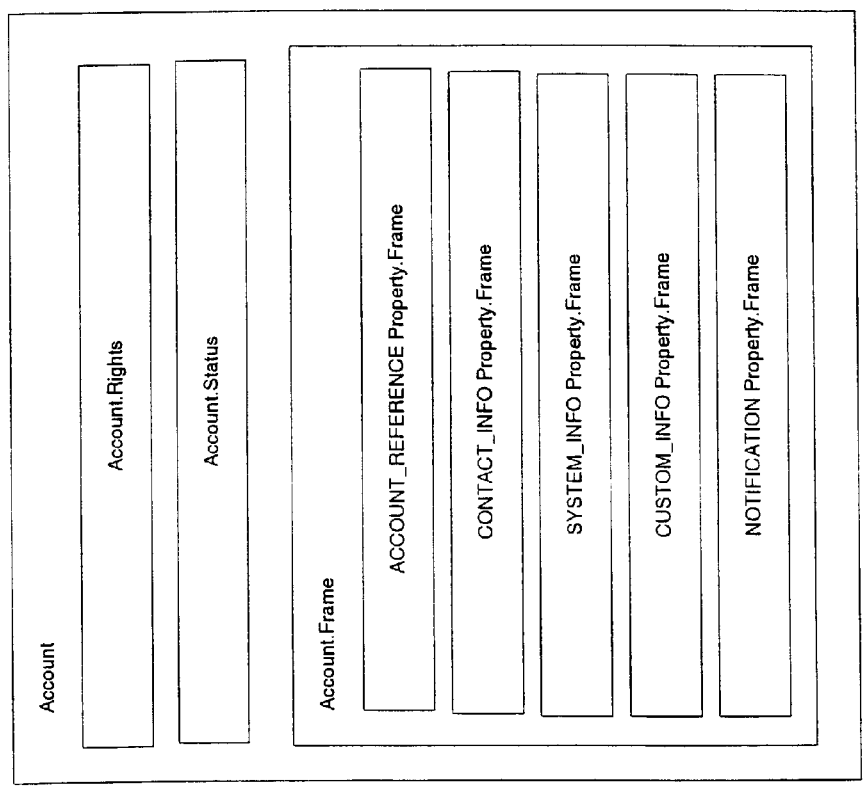
FIG. 8 illustrates an account structure according to one embodiment of the present invention.

In one embodiment accounts are defined by a collection of XML terms. FIG. 8 illustrates an XML structure defining an account. The account structure allows the developers of the client system to specify which accounts have profiles in the expertise services platform, which profiles have login and password, the types of administration rights granted, etc.

In one embodiment the host application utilizes expertise profiling API routines in order to submit content to be profiled to the expertise services platform 100. In addition, the host application may utilize the profiling API routines to provide the expertise services platform 100 with the relevance weighting to be set for the terms in an incoming message.

In one embodiment of the invention, the expertise services platform 100 provides the developers of the client's system with search API routines that allow the host application to configure the expertise services platform 100 to support features such as performing a search for an expert utilizing one or more keywords or a block of text, including matching terms and their confidence levels along with the profiles of the found experts when presenting a user with search results, displaying the position of words extracted in the original query text and specifying how the terms link to the terms within the matching profiles. The search API routines may also allow the client's system developers to specify a limit on the number of experts to be included in the search results based on the strength of the match. In addition the client's system developers may specify the information to be included in search results such as name, e.g. first and last name, of an entity who was identified as an expert in the requested information field, contact information, e.g. department/organization name, job title, address, phone number, email, matched terms with strength of match, etc.

Profile management API routines allow the client's system developers to configure the expertise services platform 100 to allow account owners to retrieve one or more term sets within their profiles. The account owners may also be allowed to move terms from one term set to another. The developers of the client's system may utilize the profile management API routines to instruct the expertise services platform 100 to place particular terms into specific term sets at the time the terms are added to a profile. The profile management API routines also allow the developers of the client's system to configure the expertise services platform 100 to export the profiles in order to allow applications other than the host application to access profiles of the entity. In one embodiment the privacy levels set by the owning account are retained and terms that are located in the private term sets are not exported. In one embodiment an exported profile consists of a data structure containing all the terms and their associated attributes in the specified account profile. Attributes include the publication status, e.g., privacy level, confidence metric, etc. In one embodiment the internal metrics utilized by the expertise services platform 100 to generate confidence levels of the terms are not included in the data structure. The data structure may be an XML formatted data structure.

In one embodiment the developers of the client's system perform expertise assessment via expertise assessment API routines. For example, the developers can create aggregate profiles, consolidating a collection of individual profiles for searching, organizational evaluation or for historical tracking over time. Aggregates may be created for any logical group of entities. In one embodiment, there may be a minimum number of profiles that need to be selected in order to generate an aggregate profile. In one embodiment, the developers may invoke an API function in order to instruct the expertise services platform to perform a search on the profiles and suggest profiles to be included in an aggregate profile. For example, the developers may instruct the expertise services platform to suggest profiles to be included in the Sales Department aggregate profile. The developers may also direct the expertise services platform to suggest aggregate profiles for every department.

In one embodiment the developers of the client's system perform term clustering by accessing the term clustering API. For example, the developers can create easy-to-read "snapshots" that quickly summarize the expertise represented by a single profile or within a set of profiles, such as all profiles within the Sales department. Term clusters are created by dynamically clustering together terms that relate to a specific area of expertise. These groupings are based on the strongest words in a profile or set of profiles (a word's strength is derived from the confidence of the terms that contain it.) Terms that contain these words are then dynamically grouped together.

The reporting API routines provide developers of the client's system with ability to obtain statistical information about the expertise services platform 100. In one embodiment the expertise services platform 100 provides details of the status and permissions of specified accounts such as whether the account is active, whether there is an associated profile, etc. In one embodiment the login activity is provided to the developers of the system when a reporting API function is invoked. The login activity report may comprise a total number of accounts that have logged in and those that have not logged in during a specified time period. In one embodiment the expertise services platform 100 returns the status report for a particular account specified by the developers. The expertise services platform 100 may also provide a term summary including a number of terms contained in every term set of a specified profile with identification of a status of each term, i.e. active or inactive. In one embodiment active terms are the ones that were utilized during a predetermined time period, for example last two months. In one embodiment, the expertise services platform 100 provides statistics on terms within term sets over the entire population of the profiles within the database.

Document summary API routines provide statistics on the types of documents that have been submitted into expertise services platform 100 to form the profiles. In one embodiment the types of documents include an archive document, which is a file such as a text document, a spreadsheet or presentation submitted directly into the expertise services platform 100; an email document which is an e-mail message sent to the profiler; an email attachment document which is the document that was included as an attachment to an email; unknown document which is a document that was not recognized by the expertise services platform 100 and was not profiled; discarded document which is a document that was not profiled because the document did not meet the minimum or maximum size criteria, or the document could not be read because id did not contain text-based content or was password-protected.

The expertise services platform may also provide the developers of the client's system with information about database status when a particular API function is invoked. The information may include the size of the database and the size of every object in the database. The information may also include unique words in the database, terms stored in the profiles, email addresses extracted during profiling, total profiled documents, etc.

It will be recognized that many of the features and techniques described above may be implemented in software. Likewise, hardwired circuitry may be used in place of software, or in combination with software, to implement the features described herein. Thus, the present invention is not limited to any specific combination of hardware circuitry and software, nor to any particular source of software. Moreover, components of the invention may reside on a processing system including a processor and a storage medium, such as a personal computer server-class computer, workstation, etc. Processing systems such as this are well known in the art and do not require any further explanation. The memory can store instructions and/or data to implement the process described above.

Thus, a method and apparatus for field of knowledge management have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A computer-implemented method comprising:
receiving, by a computer, a request to generate an aggregate profile for a business department;
accessing, by the computer, a plurality of profiles in a machine-readable data storage medium in response to the request;
determining, by the computer, that one or more terms from text of the plurality of profiles do not correspond to a recognizable format that is recognizable by the computer, wherein the one or more terms from the text are associated with a separate entity of a plurality of entities;
converting, by the computer, the one or more terms to a format that is recognizable by the computer;
extracting, by the computer, the one or more converted terms from the text, wherein each profile of the plurality of profiles includes the one or more converted terms extracted from the text associated with the separate entity of the plurality of entities;
identifying, by the computer, a group of said profiles that all belong to the business department by examining an appropriate field of account property information associated with each of said profiles;
determining, by the computer, that the identified group has at least a predetermined minimum number of profiles that belong to the business department;
generating, by the computer, an aggregate profile to represent the identified group having at least a predetermined minimum number of profiles that belong to the business department, wherein the aggregate profile has a substantially same format as the profiles so that the aggregate profile includes one or more term sets each of which is a collection of terms extracted from text associated with the entities the aggregate profile represents, and wherein the term sets are groupings of related terms; and
creating, by the computer, a summary of an expertise represented by the aggregate profile, wherein the summary is created by dynamically clustering together terms of the aggregate profile's one or more term sets that relate to the expertise.

2. The method of claim 1 wherein the entities are individuals.

3. The method of claim 1 wherein the entities are groups of individuals.

4. The method of claim 1 wherein the aggregate profile comprises a public term set.

5. The method of claim 1 wherein the aggregate profile comprises a private term set.

6. The method of claim 1 wherein the aggregate profile comprises a term set associated with a particular portion of a lexicon.

7. The method of claim 6 wherein the lexicon is a universal lexicon.

8. The method of claim 6 wherein the lexicon is an environment lexicon.

9. The method of claim 1 wherein the contents of the plurality of profiles include information descriptive of knowledge focus of the entities.

10. A method as recited in claim 1, wherein the aggregate profile further includes a degree of importance of at least one of the terms included in the aggregate profile.

11. The computer-implemented method of claim 1, wherein the request to generate the aggregate profile is received as an Application Programming Interface (API) method call from a host application.

12. The computer-implemented method of claim 1, wherein the format that is recognizable by the computer comprises at least one of an American Standard Code for Information Exchange (ASCII) format or a Hypertext Transfer Markup Language (HTML) format.

13. The computer-implemented method of claim 1, further comprising generating a profile of the plurality of profiles by:
identifying a term in a term database with a confidence value above a threshold;
determining if the profile contains a term subset associated with the term; and
if the profile contains the term subset associated with the term:
transferring the term to a profile database associated with the profile; and
adding the term to the term subset of the profile; or
if the profile does not contain the term subset associated with the term:
creating the term subset for the profile;
transferring the term to the profile database associated with the profile; and
adding the term to the created term subset of the profile.

14. The computer-implemented method of claim 1, further comprising updating a profile of the plurality of profiles by:
identifying a term in a profile database associated with the profile; and
if a confidence level associated with the term has changed or if the term has not been used during a time interval:

transferring the term from the profile database associated with the profile to a term database; and
updating a search database to reflect the transfer.

15. A computer-implemented method comprising:
integrating, by a computer, an expertise services platform into a system environment for generating profiles for accounts in the system environment; and
providing, by the computer, the system environment with a set of application program interface routines for invoking profiling features of the expertise services platform, wherein the expertise services platform is configured to perform:
receiving, by the computer, a request to generate an aggregate profile for a business department;
accessing, by the computer, a plurality of profiles in a machine-readable data storage medium in response to the request;
determining, by the computer, that one or more terms from text of the plurality of profiles do not correspond to a recognizable format that is recognizable by the computer, wherein the one or more terms from the text are associated with a separate entity of a plurality of entities;
converting, by the computer, the one or more terms to a format that is recognizable by the computer;
extracting, by the computer, the one or more converted terms from the text, wherein each profile of the plurality of profiles includes the one or more converted terms extracted from the text associated with the separate entity of the plurality of entities;
identifying a group of said profiles that all belong to a business department by examining an appropriate field of account property information associated with each of said profiles;
determining, by the computer, that the identified group has at least a predetermined minimum number of profiles that belong to the business department;
generating, by the computer, an aggregate profile to represent the identified group having at least a predetermined minimum number of profiles that belong to the business department, wherein the aggregate profile has a substantially same format as the profiles so that the aggregate profile includes one or more term sets each of which is a collection of terms extracted from text associated with the entities the aggregate profile represents and wherein the term sets are groupings of related terms; and
creating, by the computer, a summary of an expertise represented by the aggregate profile, wherein the summary is created by dynamically clustering together terms of the aggregate profile's one or more term sets that relate to the expertise.

16. The method of claim 15 wherein the profiling features include expertise profiling features.

17. The method of claim 15 wherein the profiling features include expertise search features.

18. The method of claim 15 wherein the profiling features include term set management.

19. The method of claim 15 wherein the profiling features include expertise services platform performance summary reporting.

20. The method of claim 15 wherein the accounts are accounts of entities.

21. The method of claim 20 wherein an entity is a person.

22. The method of claim 20 wherein an entity is a group of people.

23. The computer-implemented method of claim 15, wherein the machine-readable data storage medium resides on a remote computing system, and wherein the plurality of profiles are accessed utilizing at least one Internet Protocol.

24. The computer-implemented method of claim 23, wherein the at least one Internet Protocol comprises Transmission Control Protocol/Internet Protocol (TCP/IP) or Simple Mail Transfer Protocol/Internet Message Access Protocol (SMTP/IMAP).

25. The computer-implemented method of claim 15, wherein the expertise services platform is implemented using a virtual machine of the computer.

26. A processing system comprising:
a processor; and
a storage medium having stored therein instructions which, when executed by the processor, cause the processing system to perform operations comprising:
integrating an expertise services platform into a system environment for generating profiles for accounts in the system environment; and
providing the system environment with a set of application program interface routines for invoking profiling features of the expertise services platform, wherein the expertise services platform is configured to perform:
receiving a request to generate an aggregate profile for a business department;
accessing a plurality of profiles in a machine-readable data storage medium in response to the request;
determining that one or more terms from text of the plurality of profiles do not correspond to a recognizable format that is recognizable by the processor, wherein the one or more terms from the text are associated with a separate entity of a plurality of entities;
converting the one or more terms to a format that is recognizable by the processor;
extracting the one or more converted terms from the text, wherein each profile of the plurality of profiles includes the one or more converted terms extracted from the text associated with the separate entity of the plurality of entities;
identifying a group of said profiles that all belong to a business department by
examining an appropriate field of account property information associated with each of said profiles;
determining that the identified group has at least a predetermined minimum number of profiles that belong to the business department;
generating an aggregate profile to represent the identified group having at least a predetermined minimum number of profiles that belong to the business department, wherein the aggregate profile has a substantially same format as the profiles so that the aggregate profile includes one or more term sets each of which is a collection of terms extracted from text associated with the entities the aggregate profile represents and wherein the term sets are groupings of related terms; and
creating a summary of an expertise represented by the aggregate profile, wherein the summary is created by dynamically clustering together terms of the aggregate profile's one or more term sets that relate to the expertise.

27. The system of claim 26 wherein the profiling features include expertise profiling features.

28. The system of claim 26 wherein the accounts are accounts of entities.

29. The system of claim 28 wherein an entity is a person.

30. The system of claim 28 wherein an entity is a group of people.

31. The processing system of claim 26, wherein the expertise services platform is implemented using a plurality of virtual machines, and wherein different components of the expertise services platform are configured to be implemented by different virtual machines of the plurality of virtual machines.

32. The processing system of claim 31, wherein different components of the expertise services platform are configured to be implemented in parallel.

33. The processing system of claim 31, wherein different components of the expertise services platform are configured to distribute a processing load of the expertise services platform.

34. A processing system comprising:
a processor; and
a storage medium having stored therein instructions which, when executed by the processor, cause the processing system to perform a process comprising:
receiving a request to generate an aggregate profile for a business department;
accessing a plurality of profiles in a machine-readable data storage medium in response to the request;
determining that one or more terms from text of the plurality of profiles do not correspond to a recognizable format that is recognizable by the processor, wherein the one or more terms from the text are associated with a separate entity of a plurality of entities;
converting the one or more terms to a format that is recognizable by the processor;
extracting the one or more converted terms from the text, wherein each profile of the plurality of profiles includes the one or more converted terms extracted from the text associated with the separate entity of the plurality of entities;
identifying a group of said profiles that all belong to a business department by examining an appropriate field of account property information associated with each of said profiles;
determining that the identified group has at least a predetermined minimum number of profiles that belong to the business department;
generating an aggregate profile to represent the identified group having at least a predetermined minimum number of profiles that belong to the business department, wherein the aggregate profile has a substantially same format as the profiles so that the aggregate profile includes one or more term sets each of which is a collection of terms extracted from text associated with the entities the aggregate profile represents and wherein the term sets are groupings of related terms; and
creating a summary of an expertise represented by the aggregate profile, wherein the summary is created by dynamically clustering together terms of the aggregate profile's one or more term sets that relate to the expertise.

35. A processing system as recited in claim 34, wherein the aggregate profile further includes a degree of importance of at least one of the terms included in the aggregate profile.

36. The processing system of claim 34, wherein the text is received in an email message or in a Hypertext Transfer Markup Language (HTML) document.

37. The processing system of claim 36, wherein information that identifies the plurality of profiles is attached to the email message.

* * * * *

UNITED STATES PATENT AND TRADEMARK OFFICE
CERTIFICATE OF CORRECTION

PATENT NO. : 9,805,373 B1
APPLICATION NO. : 10/300088
DATED : October 31, 2017
INVENTOR(S) : Epelman-Wang et al.

It is certified that error appears in the above-identified patent and that said Letters Patent is hereby corrected as shown below:

On the Title Page

On page 2, Column 2, item [56], Line 39, delete "Confernce" and insert -- Conference --, therefor.

On page 3, Column 1, item [56], Line 63, delete "Inter@ctive" and insert -- Interactive --, therefor.

In the Specification

Column 4, Line 28, delete "214" and insert -- 215 --, therefor.

Signed and Sealed this
Third Day of July, 2018

Andrei Iancu
*Director of the United States Patent and Trademark Office*